United States Patent [19]
Flaetgen et al.

[11] Patent Number: 5,269,274
[45] Date of Patent: Dec. 14, 1993

[54] METHOD AND DEVICE FOR AN OPEN-LOOP CONTROL SYSTEM FOR AN INTERNAL COMBUSTION ENGINE

[75] Inventors: Dietmar Flaetgen, Vaihingen/Enz; Ulrich Koelle, Schwieberdingen, both of Fed. Rep. of Germany

[73] Assignee: Robert Bosch GmbH, Stuttgart, Fed. Rep. of Germany

[21] Appl. No.: 991,835

[22] Filed: Dec. 16, 1992

[30] Foreign Application Priority Data

Dec. 18, 1991 [DE] Fed. Rep. of Germany ....... 4141714

[51] Int. Cl.⁵ ............................................. F02P 5/00
[52] U.S. Cl. ................................................... 123/414
[58] Field of Search ............... 123/414, 416, 612, 618, 123/417, 418, 424, 687, 690; 364/431.05

[56] References Cited

U.S. PATENT DOCUMENTS

| | | | |
|---|---|---|---|
| 4,378,004 | 3/1983 | Petrie | 123/643 |
| 4,615,318 | 10/1986 | Imoto et al. | 123/414 |
| 4,644,917 | 2/1987 | Yakuwa et al. | 123/414 |
| 4,664,082 | 5/1987 | Suzuki | 123/414 |
| 4,706,196 | 11/1987 | Muramatsu et al. | 364/431.05 |
| 4,766,865 | 8/1988 | Hästel | 123/414 |
| 4,869,221 | 9/1989 | Abe | 123/414 |
| 4,924,830 | 5/1990 | Abe | 123/414 |
| 4,926,822 | 5/1990 | Abe et al. | 123/414 |
| 4,953,531 | 9/1990 | Abe | 123/414 |
| 5,099,811 | 3/1992 | Frantz et al. | 123/416 |
| 5,156,125 | 10/1992 | Fukui et al. | 123/414 |
| 5,184,590 | 2/1993 | Hashimoto et al. | 123/414 |

*Primary Examiner*—Raymond A. Nelli
*Attorney, Agent, or Firm*—Kenyon & Kenyon

[57] ABSTRACT

A control system for an internal combustion engine which includes a crankshaft sensor for sensing a crankshaft transmitter disk and a camshaft sensor for sensing a camshaft transmitter disk. Both sensors supply signals to a control device which calculates ignition and injection signals based upon operating parameters, such as engine load and rotational speed, with the rotational speed being based on the signals for the crankshaft sensor or camshaft sensor. In case of crankshaft sensor failure, an emergency function in the control device simulates the crankshaft signals based on the signals from the camshaft sensor. Preferably, the number of segments on the camshaft transmitter disk are equal to the number of cylinders of the engine.

12 Claims, 3 Drawing Sheets

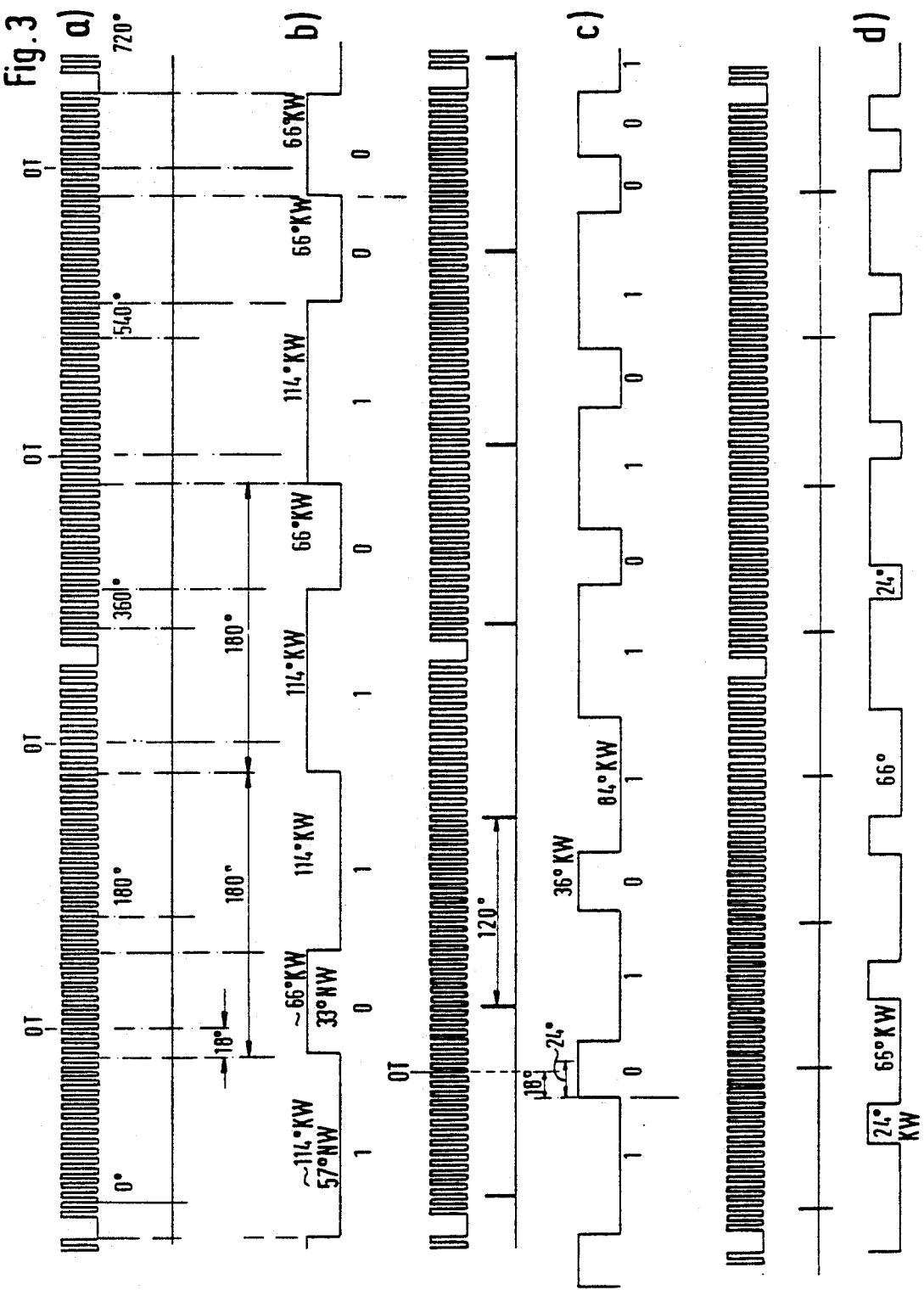

METHOD AND DEVICE FOR AN OPEN-LOOP CONTROL SYSTEM FOR AN INTERNAL COMBUSTION ENGINE

FIELD OF THE INVENTION

The present invention relates to a method and device for controlling the operation of an internal combustion engine.

BACKGROUND OF THE INVENTION

German Published patent application Ser. No. 34 31 232 discloses a "measuring transducer unit." The unit has two disks which are each connected to a rotating part of the internal combustion engine. The first disk has several segments that are equal in number to the number of engine cylinders. The leading edges of the segments are configured at the same angular distances. The position of the trailing edges is selected to allow each lug to have a different length. The second disk bears a greater number of equally spaced markings (increments). The measuring transducer unit enables the angular position of an engine crankshaft to be displayed and makes it possible to determine if the internal combustion engine is rotating in the correct direction.

U.S. Pat. No. 3,830,207 discloses a "system for controlling the ignition and injection of internal combustion engines". The disclosed system comprises a crankshaft sensor, a camshaft sensor, and a camshaft transmitter disk with a number of segments corresponding to the number of cylinders.

German Published patent application Ser. No. 39 42 800 discloses a "transmitter for cylinder recognition," which is based on a specially shaped camshaft transmitter disk in combination with a crankshaft incremental system.

German Published patent application Ser. No. 40 05 123 discloses an "ignition system for internal combustion engines," comprising a special camshaft transmitter disk with a special element for "cylinder-1 recognition."

It is apparent that the known systems cannot guarantee an optimal operation of an internal combustion engine utilizing an open-loop control system. This problem is particularly evident during start-up and emergency operation.

Therefore, the object of the present invention is to create a system, which functions optimally during start-up and emergency operation. Moreover, the object of the present invention is to simplify the design of the camshaft transmitter disk and thus, minimize the number of software components needed to evaluate the transmitter disk.

SUMMARY OF THE INVENTION

The method and device according to the present invention makes it possible to guarantee the reliable operation of an internal combustion engine, particularly during start-up and emergency operation. Moreover, the present invention makes it possible to fall back to existing elements of the signal processing unit.

According to the present invention, there can be a minimization of the amount of software needed to display the emergency operation and the functional restrictions of an emergency operation by using a simply shaped camshaft disk and applying existing program routines for the software simulation of the crankshaft transmitter signal.

BRIEF DESCRIPTION OF THE DRAWINGS

FIGS. 3A-3B show timing diagrams illustrating signals from the crankshaft and camshaft sensors of internal combustion engines of various cylinder configurations.

DETAILED DESCRIPTION

Figure 1:
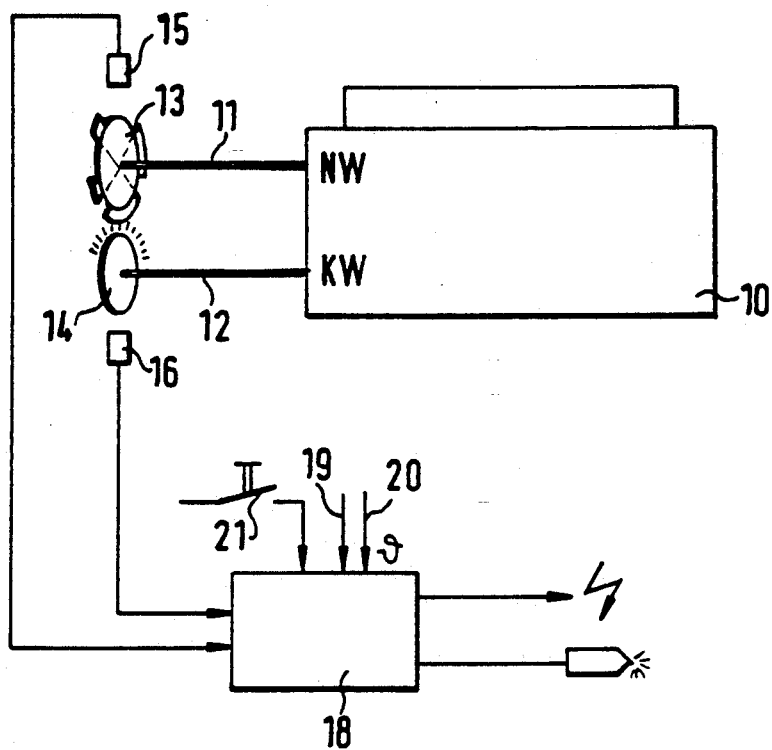
FIG. 1 shows a representation of an internal combustion engine associated with an open-loop control system of the present invention.

FIG. 1 shows the essential elements of the present invention which is an open-loop control system for an internal combustion engine. A camshaft (NW) 11 and a crankshaft (KW) 12 extend from rotating parts of an internal combustion engine 10. Transmitter disks 13 and 14 are connected to the camshaft (NW) 11 and the crankshaft (KW) 12, respectively. The transmitter disk 13 of the camshaft has segments or lugs corresponding to the number of cylinders of the internal combustion engine 10. The transmitter disk 14 of the crankshaft 12 is an incremental gear which has a multitude of teeth. When the individual shafts 11 and 12 rotate, sensors 15 and 16 of the transmitter disks 13 and 14, respectively, detect the toothed shapes of the individual transmitter disks 13 and 14. The sensors 15 and 16 route corresponding signals to a control unit 18. The control unit 18 receives additional input variables via a load signal 19 and a temperature signal 20.

A switch 21 of the motor vehicle is used to transmit a voltage supply to the control unit 18. The control unit 18 supplies output signals for ignition and injection to the internal combustion engine 10.

The structure illustrated in FIG. 1 represents the state of the art which has existed for some time. The present invention focuses on the signal processing of the individual speed signals from the two sensors 15 and 16 to obtain the rotational speed or position of the camshaft 11 and crankshaft 12, respectively. Moreover, the present invention involves an especially effective refinement of the camshaft's sensor disk 13.

Figure 2:
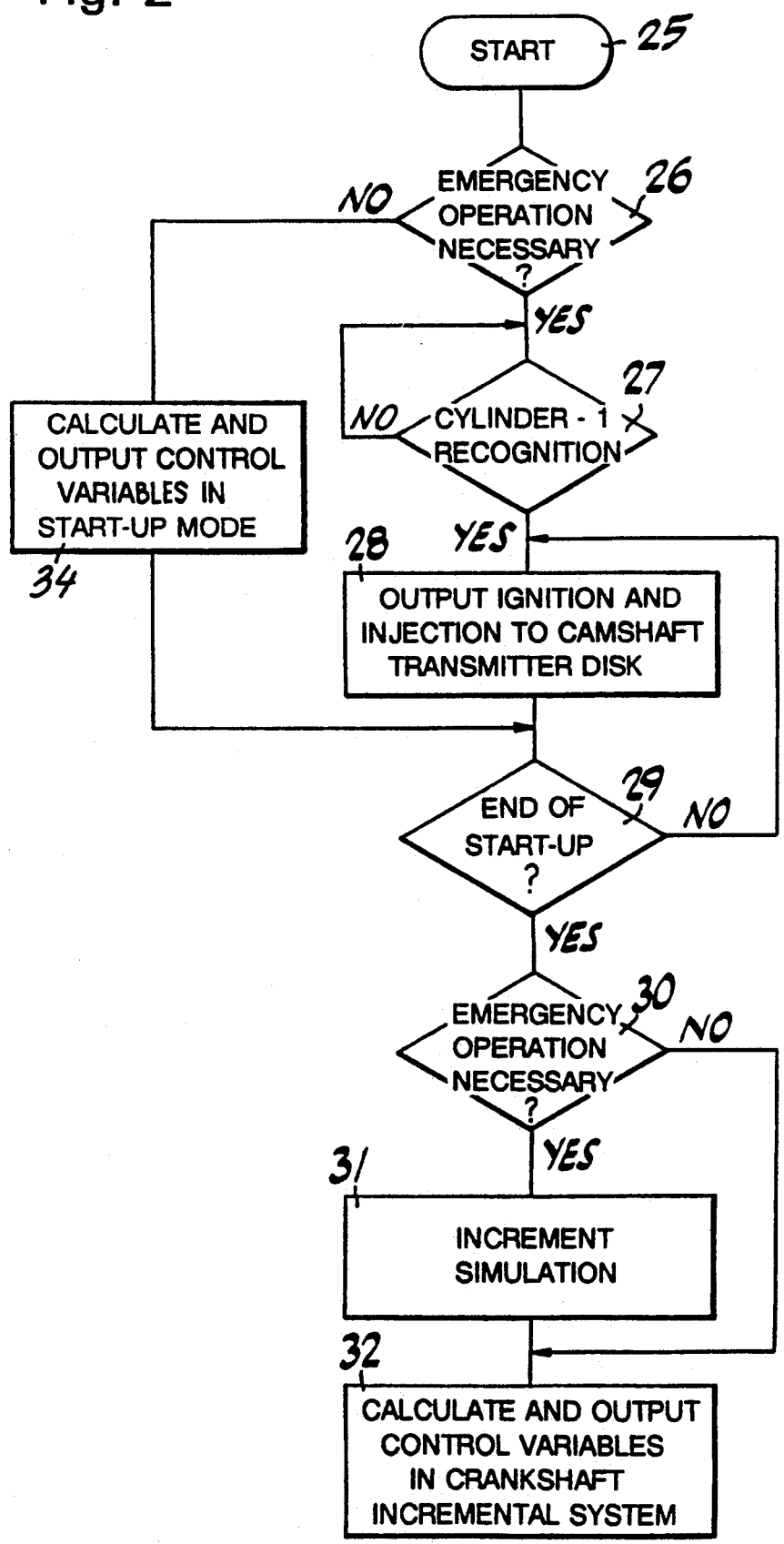
FIG. 2 is a flow chart illustrating the method of operation of the open-loop system according to the present invention.

FIG. 2 illustrates a flow chart of one part of the control system according to the present invention. In particular, the flow chart represents the queries and actions pertaining to the requirements of an emergency operation.

Step 25 denotes the start of the flow chart. In step 26, a query is performed to determine whether an emergency operation is necessary. For this purpose, the existence of the crankshaft signal and the plausibility between the crankshaft signal and the camshaft signal are checked by a constantly active program part. An emergency operation case is established (emergency bit set or cleared) based on the results of this check. If an emergency operation is necessary, a cylinder-1 recognition action is taken in the step 27 loop. To perform the cylinder-1 recognition, a time entry is filed with every edge change of the camshaft transmitter wheel. A comparison of the time entries is made to determine whether a 0-segment (short segment) or a 1-segment (long segment) lies within a range of 180 degrees and in which sequence the segments occur. In one embodiment of the invention involving a four cylinder engine, the comparison of the time entries is over 180 degrees. In other embodiments, the number of degrees over which the comparison is made is computed by dividing 720 degrees by the number of cylinders in the internal combustion engine. Moreover, in one embodiment, the positive edge of the segment is used to designate an edge change. However, an inversely designed transmitter disk is also possible.

Since the sequence of the segments is clearly in relationship to the crankshaft, a definite cylinder allocation can be made after 3 positive edges ($>=360$ degrees in the case of a four-cylinder engine). In the following step 28, the ignition and injection are output to the positive edges of the segments of the camshaft transmitter disk. Afterwards, the end of the start-up is queried in the step 29. Subsequently, a renewed query is made in step 30 to determine whether an emergency operation is necessary. If it is necessary, a corresponding simulation follows in step 31. This simulation starts from the segments of the camshaft transmitter disk 13 when the sensor 16 for the crankshaft increments malfunctions. This simulation is possible because of the rigid coupling of the crankshaft and the camshaft, starting from the crankshaft pulse generation. Therefore, a frequency signal or a uC-internal interrupt sequence, originating with the camshaft transmitter, can be generated replacing the original signal of the crankshaft sensor 16. Following the increment simulation in step 31, normal calculation and output of the individual internal combustion engine control data in the crankshaft incremental system take place in step 32.

If the query in step 26 reveals that no emergency operation is necessary at start-up, the calculation and output of the individual control variables in the normal start-up mode follow in step 34. Subsequently, the system continues to the connecting point between steps 28 and 29.

As long as the end of start-up is not reached in the engine-end-of-start-up of step 29 (engine speed lies over an applicable speed limit), step 28 will require that the beginning of the closing operation for the following ignition and injection are output in each case to the positive edges.

If an emergency operation has proven not to be necessary in the query of step 30, the system proceeds immediately to step 32. The calculation and output of the individual control variables in the crankshaft incremental system are performed in step 32.

If an emergency operation is necessary at start-up, a cylinder-1 recognition follows with the transmitter signals that are still available and the beginning of closing operation is output for the subsequent ignition and injection signals. This output is strictly oriented to the edges of the sensor disk 13 of the camshaft 11. When no emergency operation must be provided at start-up, a normal calculation of the output follows in the normal start mode.

The emergency operation query is also made in step 30 after the end of start-up to determine whether an emergency operation must be provided.

If the signal from the crankshaft sensor 16 proves to be faulty or if it fails to appear entirely, the pulse pattern of the crankshaft sensor 16 is generated based on the signal of the camshaft sensor 15, using special signal or interrupt means. The system proceeds with these simulated increment pulses. In one embodiment of the present invention, this simulation can be undertaken depending on the processor type, via a timer. On the software side, it can be done by generating an internal interrupt or outputting a corresponding signal pattern to a computer port with an interrupt-supported evaluation by means of another computer port.

In conjunction with a crankshaft-increment signal as well as a camshaft-segment signal, the control system comprises means for
  evaluating levels of the camshaft signal,
  counting the crankshaft increments within a 720° cylinder-number segment of the camshaft,
  recognizing cylinders based on the detection of a specified crankshaft increment number for the duration of a given camshaft signal level.

As an alternative, cylinder recognition can be based on a characteristic sequence of the successive segments.

These two solutions offer the advantage of a faster cylinder recognition than is possible starting from a pure incremental system with a tooth space in the crankshaft transmitter wheel.

FIG. 3 depicts pulse patterns from the crankshaft sensor 16 and the camshaft sensor 15. These patterns are plotted over time, by the angle of the individual shafts, and with various sensor disks 13 for the camshaft in relation to a 4-, 6- and 8-cylinder internal combustion engine.

In FIG. 3a, the crankshaft increments are specially plotted over the angle. Furthermore, a reference mark can be recognized in the form of two missing tooth increments.

FIG. 3b depicts the signal from the camshaft sensor 15 in the case of a sensor disk 13 for a 4-cylinder internal combustion engine. The sensor disk 13 for the camshaft has four segments per revolution (720° crankshaft), whose rising edges exhibit a crankshaft spacing of 180°. The rising edge itself lies advantageously near the starting ignition angle. In the selected example, this angle is about 18° before the top dead center of each cylinder. The individual segments and the segment intervals alternate with each other in segment length, beginning with a long segment interval. A short segment follows, which is followed by another long segment interval. Two long segments ensue with a short segment interval. This is followed by a short segment interval and, likewise, a short segment. In another embodiment, the transmitter disk of the camshaft can be designed inversely.

The ratio of short to long, preferably, in the case of a 4-cylinder internal combustion engine, amounts to 66° : 114°. This ratio is not mandatory, and could even be more asymmetrical. A ratio must be selected so as to allow the short and long time component to be reliably recognized within a 180° range from positive to positive edge for all modulations of the rotational speed in the starter operation. It is also important, in the case of the sensor disk for the 4-cylinder internal combustion engine, for the short segments to be adjacent to each another. The long segments have the same requirement.

This shaping of the camshaft transmitter wheel makes it possible to derive a clear cylinder recognition.

FIG. 3c shows the corresponding ratios for a 6-cylinder internal combustion engine. The six segments are recognizable because the rising edges lie at equidistant angular distances. The rising edge of each segment lies advantageously near the starting ignition angle, i.e. about 18° before the corresponding top dead center. The ratio of the short segment to the long segments, or the short segment intervals to the long segment intervals amounts to 36° : 84°. In the case of the pulse pattern of FIG. 3c, it is apparent that the short segments and the long segments lie one behind the other.

FIG. 3d shows correspondingly the ratios for an 8-cylinder internal combustion engine with a significant short-long ratio of, for example, 24° : 66°, which corresponds to a ratio of 4 : 11. other suitable ratios can lie in the range of between 1 : 2 to 1 : 4. Generally, the ratio must be selected in a way that allows the short and long phases of the segment being considered (720°/cylinder number) to be reliably recognized.

The sensor disk shapes for the camshaft, as indicated in FIGS. 3b, c, and d, make it possible to realize an emergency operation corresponding to step 28 of FIG. 2 with relative ease based on the position of their respective rising edge. Since the rising edge of each segment is in the proximity of the starting ignition angle, the rising edge can serve as a trigger point for ignition and injection. As such, the segment configuration has little effect on the dynamic speed response in the start-up range. Thus, a reliable engine start-up can be carried out.

Because of the rigid coupling between the crankshaft revolution and the camshaft revolution, it is also relatively easy to supply a simulated crankshaft increment signal in the form of a signal. This signal is output at a processor pin or in the form of an internal interrupt generation within the scope of step 31 in FIG. 2.

Figure 4:
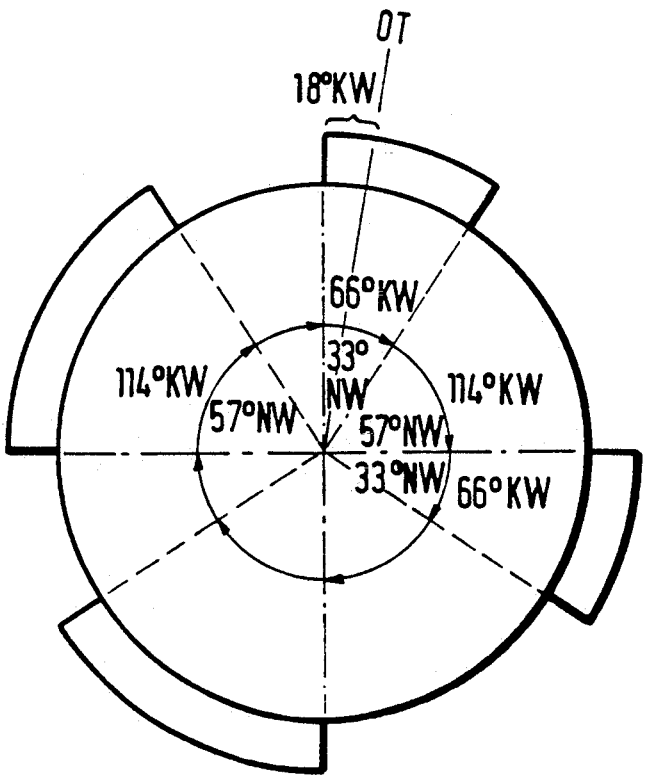
FIG. 4 illustrates a camshaft transmitter disk for a four-cylinder internal combustion engine.

Finally, FIG. 4 depicts the camshaft transmitter disk for a 4-cylinder internal combustion engine corresponding to the depiction of FIG. 3b.

What is claimed is:

1. An open-looped control system for an internal combustion engine comprising:
   a first transmitter disk coupled to a crankshaft of the engine, with the first transmitter disk having a first predetermined number of increments;
   a second transmitter disk coupled to a camshaft of the engine, with the second transmitter disk having a second predetermined number of segments;
   a first sensor for sensing an angular position of the first transmitter disk based on a position of the increments on the first transmitter disk and providing a first output signal representative of the angular position of the first transmitter disk;
   a second sensor for sensing an angular position of the second transmitter disk based on a position of the segments on the second transmitter disk and providing a second output signal representative of the angular position of the second transmitter disk; and
   a control device for providing at least a third and a fourth signal as outputs for controlling operation of the engine, with the control device calculating the third and fourth signals based on at least an engine load signal and a rotational speed signal, the rotational speed signal being based on the first signal, or the second signal if the first sensor fails to generate the first signal, with institution of the second signal being a starting point for calculating the third and fourth signals.

2. The system as recited in claim 1, wherein if the crankshaft sensor fails at engine start-up, the third and fourth signals for controlling the engine are based the second signal, with a predetermined edge of a segment and subsequent edges of the following segments of second transmitter disk being used to simulate a first signal.

3. The system as recited in claim 2, wherein the third signal is an injection signal.

4. The system as recited in claim 2, wherein the fourth signal is an ignition signal.

5. The system as recited in claim 1, wherein the second transmitter disk has segments disposed thereon such that cylinder-1 recognition is determined by a length and spacing of such segments within a predetermined angular portion of the second transmitter disk, with the third signal being output after cylinder-1 recognition is performed.

6. The system as recited in claim 2 or 5, wherein a number of segments on the second transmitter disk equal a number of cylinders of the engine, with one of the segments having an edge at or near a starting ignition angle of the engine and with predetermined edges of a plurality of segments being equidistantly disposed on the second transmitter disk.

7. The system as recited in claim 6, wherein the segments of the second transmitter disk include a short segment having a first predetermined angular length and a long segment having a second predetermined angular length.

8. The system as recited in claim 7, wherein the long and short segments of the second transmitter disk have a length ratio of 114° : 66° for a 4 cylinder engine.

9. The system as recited in claim 7, wherein the long and short segments of the second transmitter disk have a length ratio of 840 360 for a 6 cylinder engine.

10. The system as recited in claim 7, wherein the long and short segments of the second transmitter disk have a length ratio of 84° : 36° for a 6 cylinder engine.

11. The system as recited in claim 7, wherein the second transmitter disk includes an equal number of long and short segments.

12. The system as recited in claim 7, wherein an angle of <12° before top dead center is a starting ignition angle.

* * * * *